UNITED STATES PATENT OFFICE.

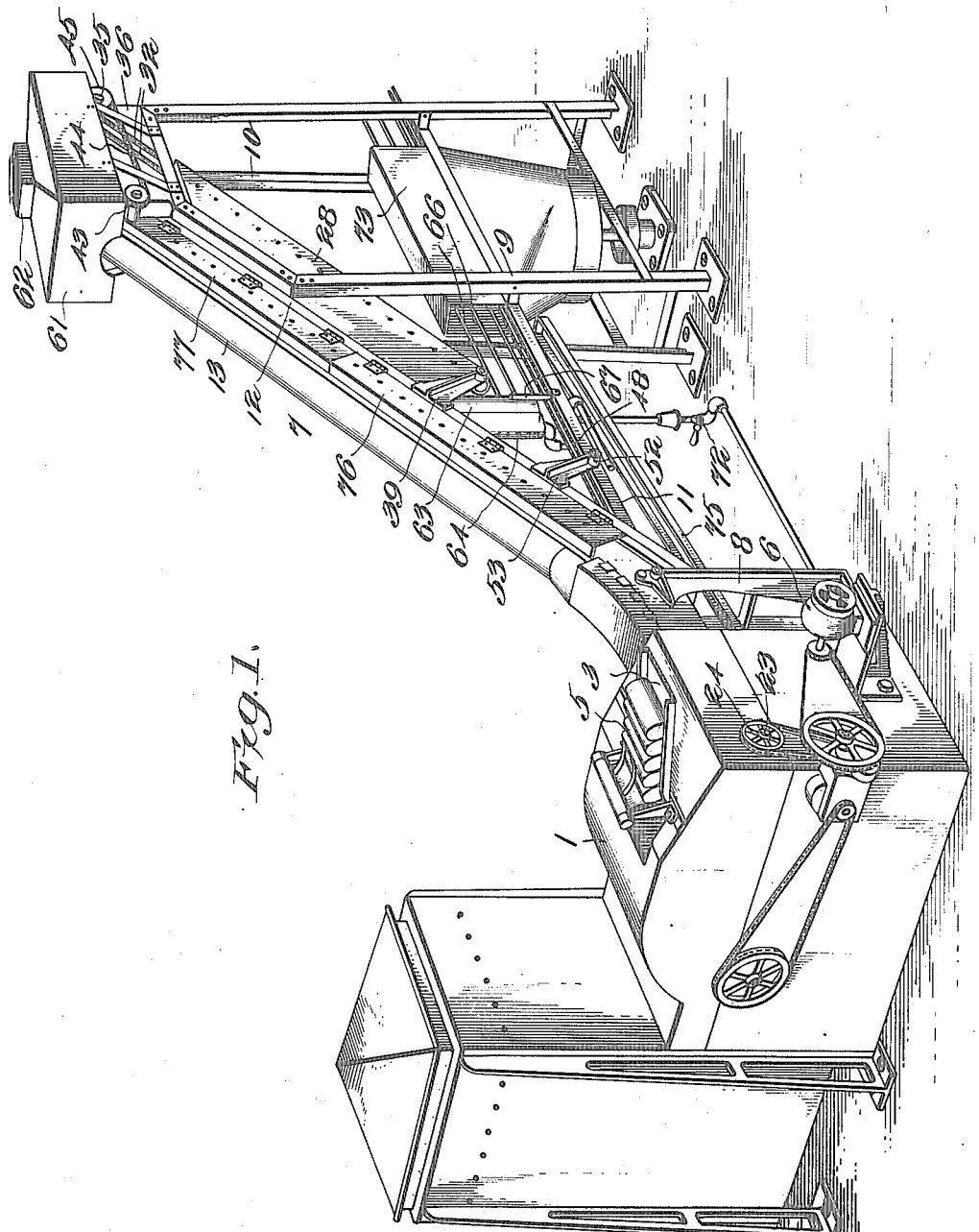

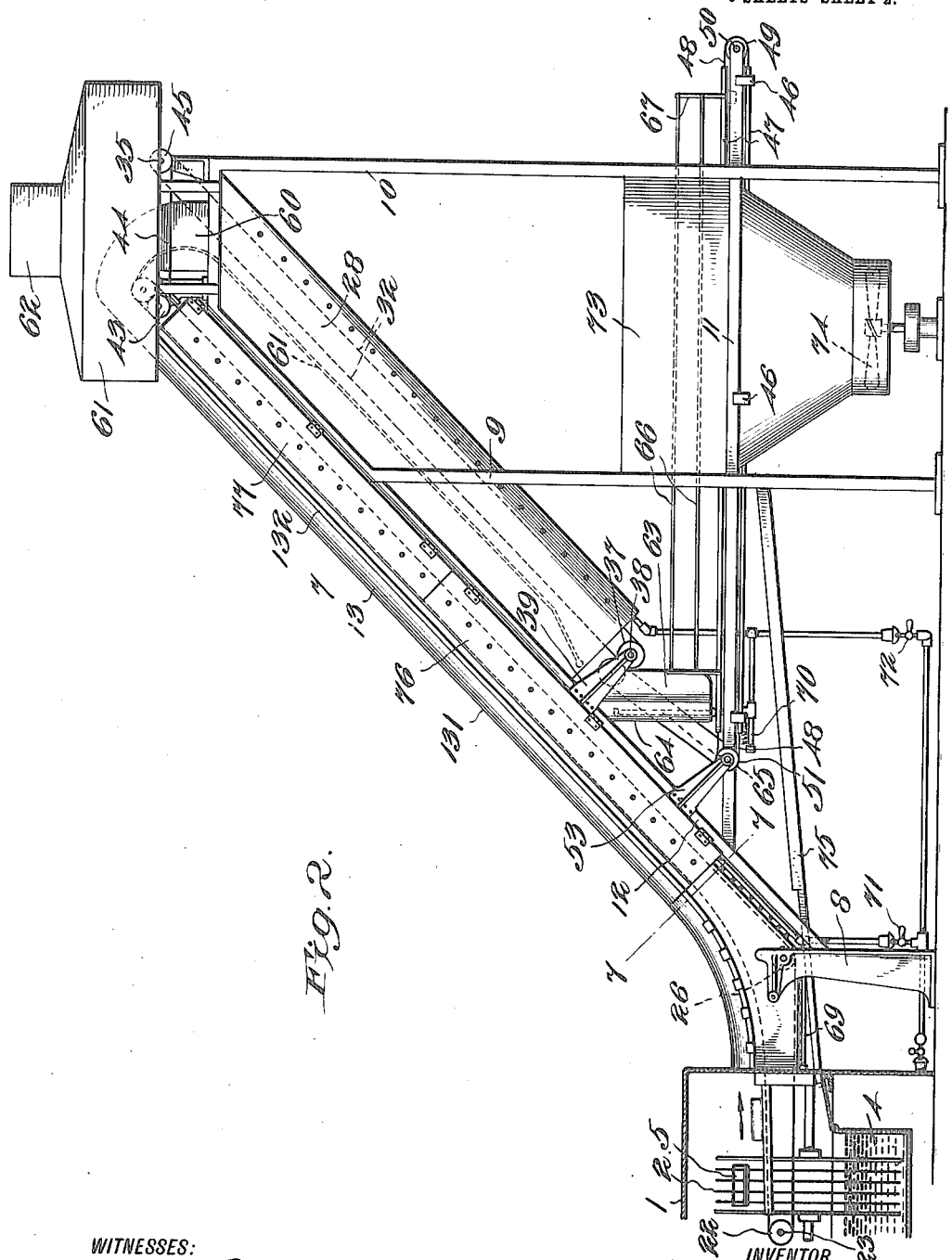

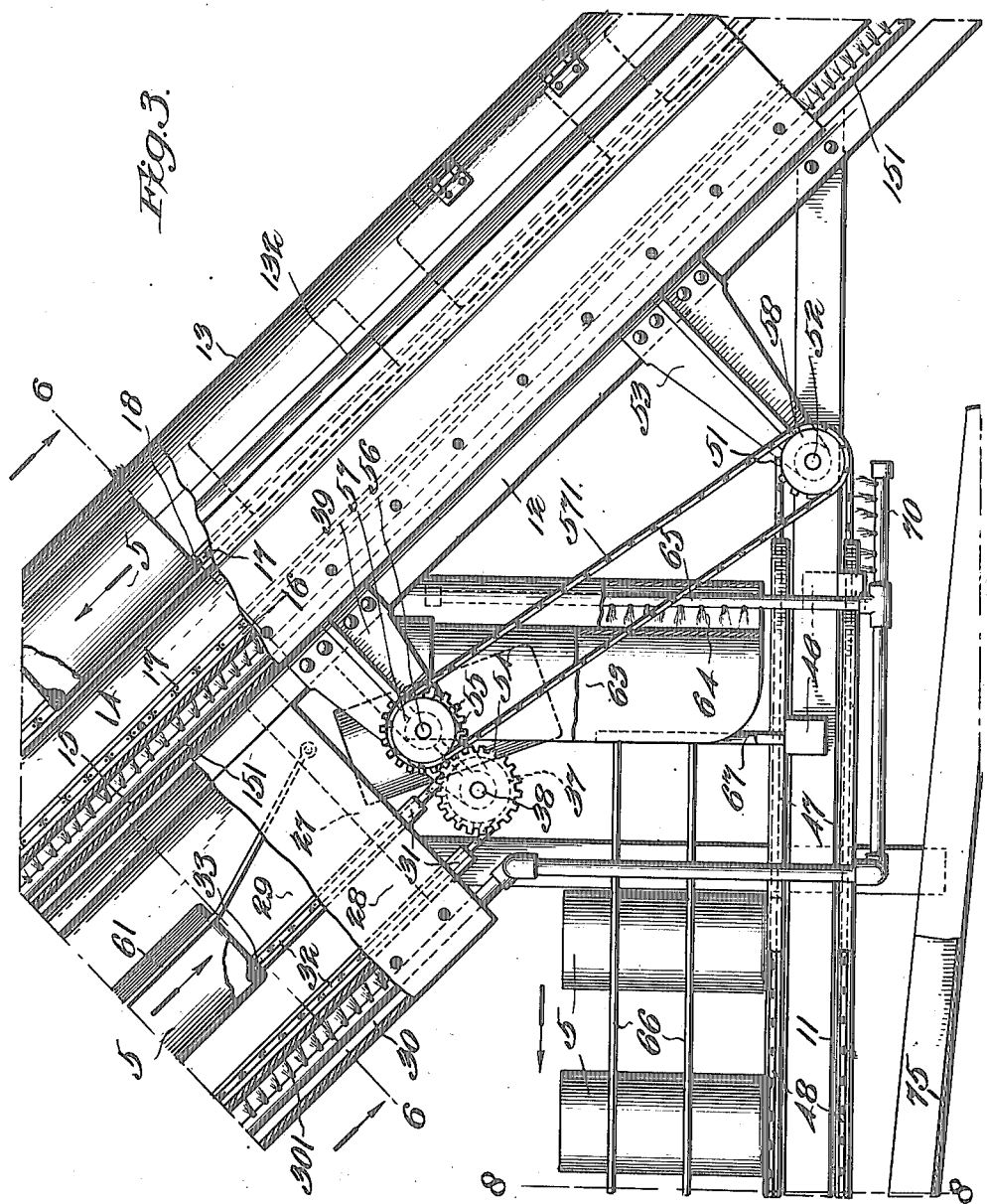

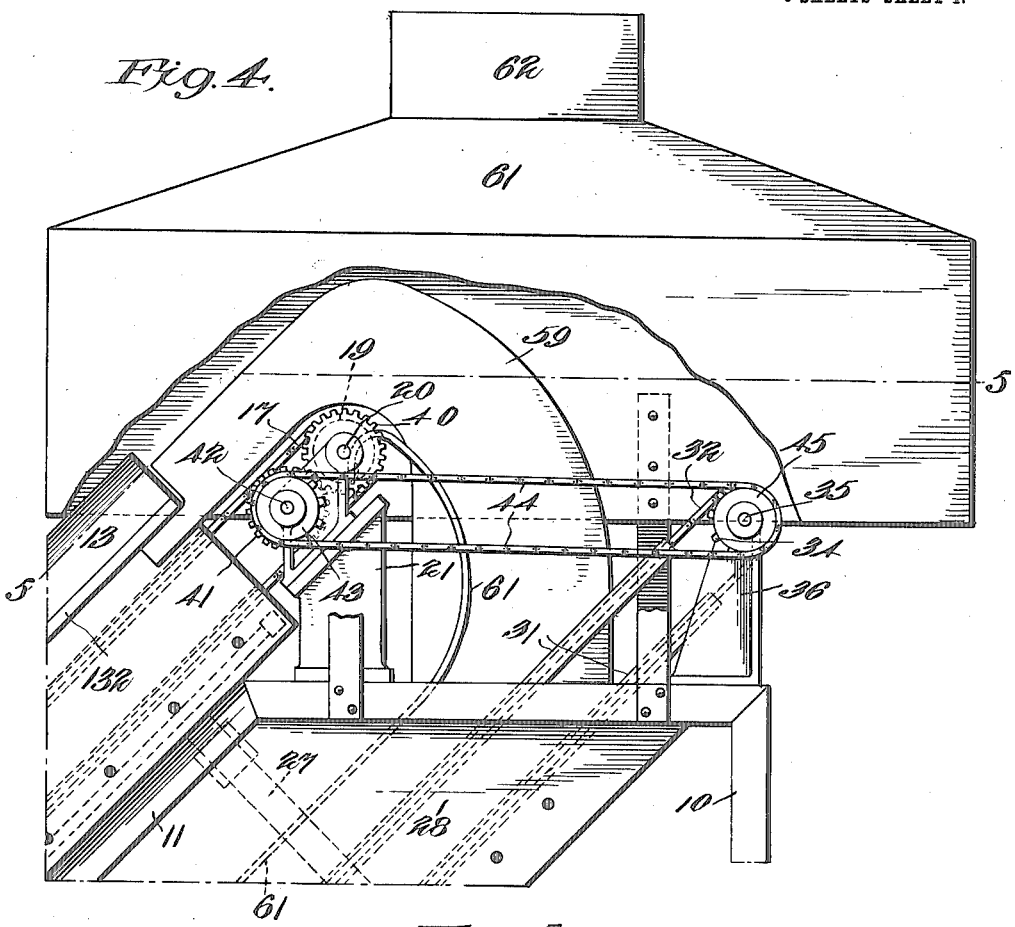

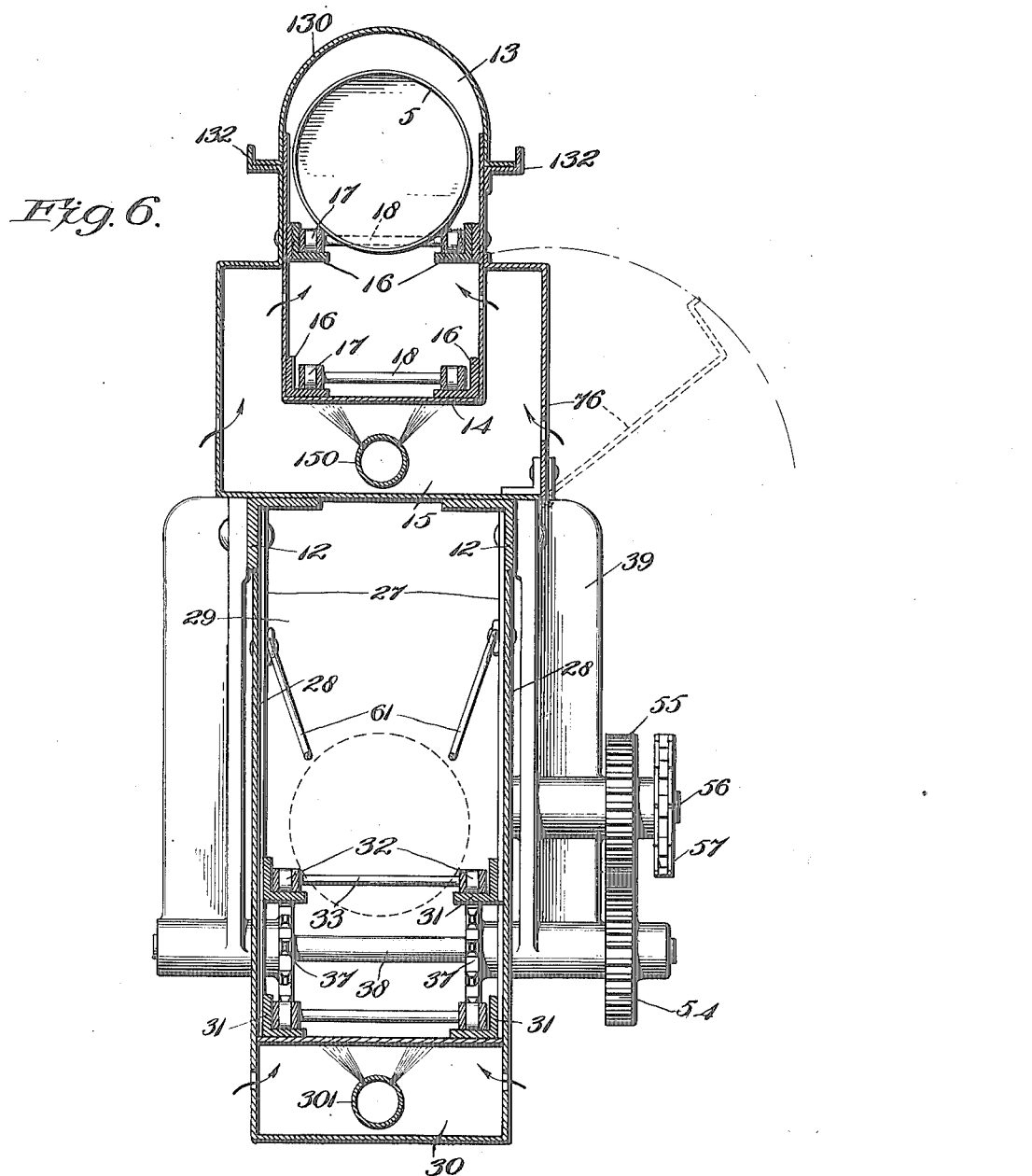

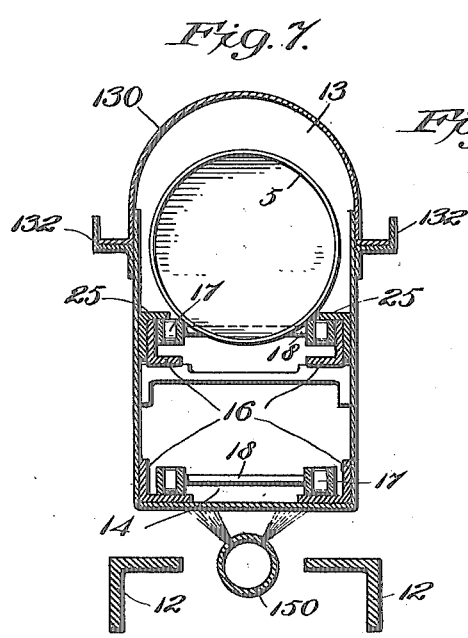
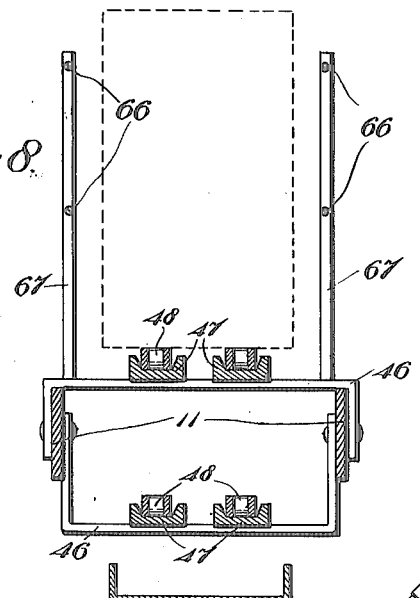
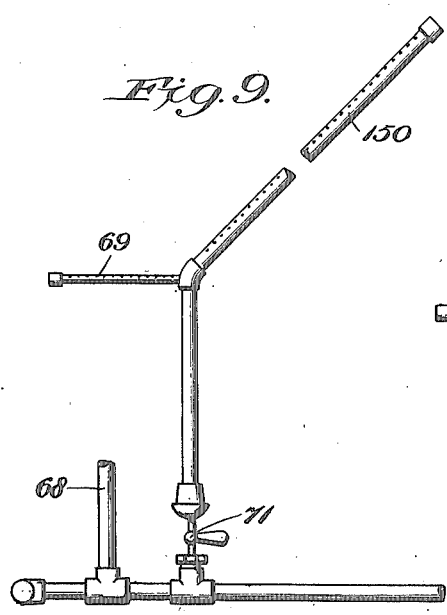
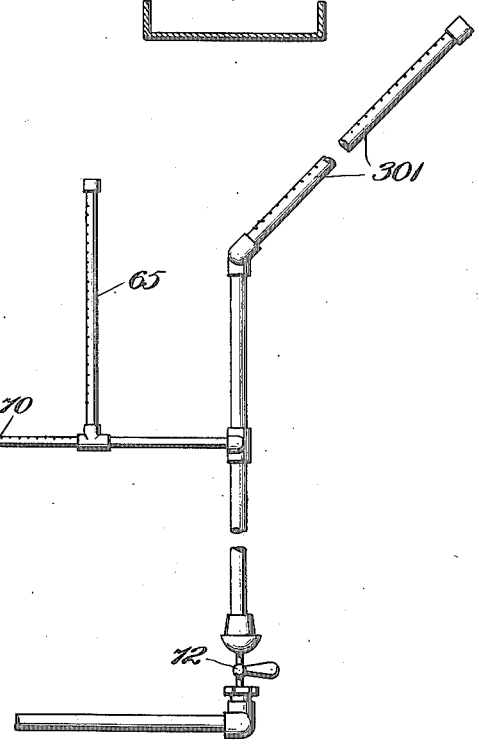

GEORGE W. BEADLE, OF BAYONNE, NEW JERSEY, ASSIGNOR TO SINGLE SERVICE PACKAGE CORPORATION OF AMERICA, OF NEW YORK, N. Y., A CORPORATION OF NEW JERSEY.

MACHINE FOR DRYING CARTONS.

1,135,985.            Specification of Letters Patent.      Patented Apr. 20, 1915.

Application filed October 24, 1911. Serial No. 656,436.

*To all whom it may concern:*

Be it known that I, GEORGE W. BEADLE, a citizen of the United States, residing at Bayonne, in the county of Hudson and State of New Jersey, have invented certain new and useful Improvements in Machines for Drying Cartons; and I do hereby declare the following to be a full, clear, and exact description of the invention, such as will enable others skilled in the art to which it appertains to make and use the same.

This invention relates to drying machines, and especially to that type of machine which may be connected to and operated by a coating machine, such as is described and claimed in my copending application Serial No. 656,438 filed October 21, 1911, and entitled machine for coating cartons.

The object of this invention is to provide a machine of this character that will receive a carton or the like after it has been thoroughly coated with paraffin, and dry the same with certainty and expeditiously.

A further object is to provide a machine that is comparatively simple in construction and so arranged as to take up as small floor space as possible.

With these and other objects in view, the invention consists in the novel details of construction and combinations of parts more fully hereinafter described and particularly pointed out in the claims.

Referring to the accompanying drawings forming a part of this specification in which like numerals designate like parts in all the views:—Figure 1 is a perspective view of my improved machine shown connected to and operated by a paraffin coating machine; Fig. 2 is a side elevational view of the parts shown in Fig. 1, but showing part of the paraffin coating machine broken away for the sake of clearness; Fig. 3 is an enlarged partly sectional detail side elevational view of a portion of the machine, and showing a part of the driving mechanism; Fig. 4 is an enlarged detail side elevational view of the top part of the machine with the hood broken away; Fig. 5 is a horizontal cross sectional view taken on the line 5—5 of Fig. 4 and looking down; Fig. 6 is a cross sectional view taken on the line 6—6 of Fig. 3, and looking in the direction of the arrows; Fig. 7 is a cross sectional view taken on the line 7—7 of Fig. 2; Fig. 8 is a cross sectional view taken on the line 8—8 of Fig. 3; and, Fig. 9 is a detail side elevational view of the system of piping employed.

1 indicates a paraffin coating machine, such as that disclosed in my application above, and provided with the paraffin wheel 2 (Fig. 2) which is adapted to receive cartons 5 from the supply chute 3, and immerse them in a hot bath of paraffin 4. This paraffin wheel 2 is revolved through suitable mechanism (Fig. 1) by the electric motor 6 and the coated cartons delivered to the conveyer 17, all as will be clear from my application above.

Connected to the side of the coating machine 1 is my drying machine 7, which contains the conveyer 17 carrying the wet cartons from the paraffin wheel 2, and serving to drain and dry them, as will now appear.

The framework of the drying machine rises at an angle of about 45 degrees and comprises the short standards 8, and the long standards 9 and 10 rigidly connected by the longitudinal bars 11 (Fig. 1) and longitudinal bars 12 (Figs. 6 and 7).

Rigidly mounted on the top of the angle bars 12 is a chute 13 comprising the draining chamber 14 for the cartons and the heating chamber 15, heated by the gas burners 150. This chute is so constructed that the flanged top 130 overlaps the sides and seats itself in the grooves of the extensions 132 so that it can be removed when necessary, and yet form practically an air tight joint.

Mounted within the draining chamber and adapted to travel on the angle bars 16 with which said chamber is provided, is the endless conveyer 17 provided with a series of cross rods 18. This conveyer travels at the upper end of the chute over the sprockets 19, mounted on the shaft 20, (Fig. 4) held in the bracket 21, and at the lower end of the chute over the sprockets 22 (Fig. 2) mounted on the shaft 23 held within the paraffin machine 1, and operated by the motor 6, by means of the connections shown and comprising the sprocket 24.

The top run of the conveyer 17 in passing from the paraffin machine to the drying machine or from the horizontal to the upwardly inclined position, is guided by the inverted angle bars 25 (Fig. 7) and the lower run is guided by the idler sprockets 26 mounted on the short standards 8 (Fig. 2).

Connected to the angle bars 12 and suspended therefrom are the strap rods 27 (Figs. 4 and 6) for supporting a second chute 28 immediately below the chute 13. This second chute comprises a receiving chamber 29, and a heating chamber 30 (Fig. 3) to accommodate the gas burners 301. Cartons after being drained bottom up in the first chute are delivered to this second chute bottom down, for a purpose and in a manner to be described below.

Mounted within this second chute 28 and adapted to travel within the chamber 29, on the angle bars 31, are a set of second endless conveyer chains 32 provided with a series of cross rods 33. These chains or conveyers 32 travel, at their upper ends, over the sprockets 34 (Fig. 4) mounted on the shaft 35 held within the brackets 36 to the top framework of the machine, and at their lower ends over the sprockets 37 (Fig. 3) mounted on the shaft 38 held within the brackets 39 suspended from the angle bars 12. These said conveyer chains 32 are also adapted to be operated by the conveyers or chains 17 through the gear 40 (Figs. 4 and 5) mounted on the shaft 20 meshing with the gear 41 mounted on the inner end of the stud shaft 42, sprocket wheel 43 mounted on the outer end of the stud shaft 42, and sprocket chain 44 and sprocket 45 mounted on the outer end of the shaft 35.

Connected to the longitudinal and horizontal bars 11 by the supports 46 (Figs. 2 and 8) are the channel irons 47 which are adapted to carry a third set of endless conveyers or chains 48 adapted to receive the cartons from the second conveyers, as will appear below. These chains travel at their outer ends over sprockets 49 (Fig. 2) mounted on a shaft 50 held within the horizontal bars 11, and at their inner ends over sprockets 51 mounted on a shaft 52 held in the brackets 53 suspended from the angle bars 12 of the machine. These said third conveyers or chains 47 are adapted to be operated (Figs. 3 and 6) by the second conveyer chains 32 through the gear 54 mounted on the shaft 38, meshing with the gear 55 mounted on the stud shaft 56, sprocket wheel 57 rigid with the gears 55, sprocket chain 571, and sprocket 58 mounted on the end of the shaft 52.

59 and 60 indicate guard plates (Figs. 2, 4 and 5) connected to the top of the chute 13, and to the frame of the machine, which together with guide bars 61 located within the second chute, and connected at their lower ends to the strap rods 27 and at their upper ends to the bracket 21 serve to guard and to guide the cartons as they are delivered from the first conveyers or chains 17 to the second conveyers or chains 32.

A hood 61 is mounted on the top of the machine and connects to a pipe 62 for carrying off any gases or fumes that may arise.

63 (Figs. 1, 2 and 3) indicates a semi-cylindrical guard provided with a heating chamber 64, having the gas burner 65 (Figs. 2, 3 and 9). This guard is located at the delivery or lower end of the chute 28, and between the brackets 39 for the purpose of guiding and changing the cartons from their angular position on the second conveyer chains 32 to an upright position on the third conveyer chains 48.

Longitudinally disposed, horizontal guard rods 66 held in uprights 67 mounted on the horizontal bars 11 prevent the cartons from falling off the third conveyer chains 48 while they are being transported.

All of the heating chambers are provided with the necessary openings, not shown, for admitting air to the burners.

The gas burners 150, 301 and 65 (Figs. 2, 6 and 9) are connected through piping to the gas supply pipe 68. Additional gas burners 69 and 70 are placed in the piping for heating parts of the machine not otherwise inclosed by the heating chambers. All of the gas burners are controlled by the valves 71 and 72 or other suitable means.

Mounted on the frame of the machine between the standards 9 and 10 and surrounding the third conveyer chains 48 is a compartment 73 (Fig. 2) which receives a continuous blast of air from the fan 74, operated from any source of power, and which serves as a chamber for further drying and cooling the cartons.

A drip pan 75 (Figs. 1 and 2) is mounted on the framework of the machine below the second and third conveyers for catching any paraffin that may drop and convey it back into the paraffin coating machine. Doors 76 and 77 are also provided on the sides of the chute 13 for lighting the gas burners 150.

The operation of the machine is as follows:—Paper cartons or the like after they have been thoroughly coated in a paraffin coating machine, such as 1, are delivered automatically to the conveyer chains, as disclosed in my application above, of the drying machine. The cross rods 18 on the conveyer chains 17 carry said cartons up the heated chute 13, and if they were originally placed on the chute 3 of the coating machine with their bottoms all to the right, as seen in Fig. 1, they will be carried around by the wheel 2 and delivered to the conveyer 17 with their bottoms in the same direction. But, since the conveyer 17 extends upwardly and at substantially right angles to the plane of the wheel 2, the cartons when delivered to said conveyer, will have their bottoms gradually raised and their open mouths inverted.

so that they will be drained of their surplus paraffin.

After reaching the top of the chute, however, the cartons are carried over the end thereof bottom foremost, and are guided by the plates 60 and rods or bars 61, onto the second conveyer 32, which receives them bottom down. In other words, all paraffin that is not needed in the walls of the cartons is drained out while on the first conveyer, and any surplus that may still stick to the walls is drained back to the bottom seams while on the second conveyer. In this way, the bottom seams are supplied with an extra quantity of paraffin at a minimum cost, as will be clear from Fig. 3 of the drawings. But, this extra paraffin should be evenly distributed around the bottom seams, and to accomplish this end, the cartons 5 are delivered from the second conveyer 32 to the third conveyer 48, while their position is changed from an inclined one to an upright position bottom down. Since during all of the above movements, the chutes are kept sufficiently hot to permit the paraffin to flow easily, the surplus paraffin left inside the carton, will not only be evenly distributed around the bottom seams, but no more paraffin will be left on the walls of the carton than is necessary. As soon as the above results have been accomplished, the cartons are cooled in the chamber 73, from which they may be collected or delivered in any suitable manner.

It is obvious that those skilled in the art may vary the details of construction, as well as the arrangement of parts, without departing from the spirit of my invention and therefore I do not wish to be limited to the above disclosure except as may be required by the claims.

What I claim is:—

1. In a carton drying machine, the combination of an inclined conveyer; rotary means for feeding wet cartons on to said conveyer so their bottoms will point upwardly; means for catching the drippings from said wet cartons while on said inclined conveyer; a second conveyer associated with said inclined conveyer; means for delivering said cartons from the first to said second conveyer and reversing said cartons during the delivering operation so that their bottoms will be down on said second conveyer; a third conveyer; and means to deliver said cartons from the second to said third conveyer and causing said cartons to assume a vertical position with their bottoms down on said third conveyer, substantially as described.

2. In a carton drying machine, the combination of a pair of upwardly inclined conveyers; means for delivering wet cartons bottom up to the first of said conveyers; means to then deliver said cartons bottom down from said first to the second of said conveyers; means to catch the drip from each of said conveyers; a drying chamber associated with each of said conveyers; a horizontal conveyer adapted to receive said cartons from said second conveyer; and means adapted to cause said cartons to pass from an inclined position bottom down on said second conveyer to an upright position bottom down on said horizontal conveyer, substantially as described.

3. In a carton drying machine, the combination of a first upwardly inclined conveyer; a second upwardly inclined conveyer adapted to receive cartons from said first conveyer; a third horizontally extending conveyer adapted to receive cartons from said second conveyer; means for so delivering wet cartons to said first conveyer that they will occupy an inclined position bottom up while on said first conveyer; means for causing said cartons in passing from said first to said second conveyer to reverse their positions and ride bottom down; and means for causing said cartons in passing from said second to said third conveyer to change from an inclined position bottom down to an upright position bottom down on said third conveyer, substantially as described.

4. In a carton drying machine, the combination of a first upwardly inclined conveyer; a second upwardly inclined conveyer adapted to receive cartons from said first conveyer; a third horizontally extending conveyer adapted to receive cartons from said second conveyer; means for so delivering wet cartons to said first conveyer that they will occupy an inclined position bottom up while on said first conveyer; means for causing said cartons in passing from said first to said second conveyer to reverse their positions and ride bottom down; means for causing said cartons in passing from said second to said third conveyer to change from an inclined position bottom down to an upright position bottom down on said third conveyer; and means for operating each of said conveyers from a common source of power, substantialy as described.

5. In a carton drying machine, the combination of a first upwardly inclined conveyer; a second upwardly inclined conveyer adapted to receive cartons from said first conveyer; a third horizontally extending conveyer adapted to reecive cartons from said second conveyer; means for so delivering wet cartons to said first conveyer that they will occupy an inclined position bottom up while on said first conveyer; means for causing said cartons in passing from said first to said second conveyer to reverse their positions and ride bottom down; means for causing said cartons in passing from said second to said third conveyer to change from an inclined position bottom down to an upright position bottom down on said third conveyer; a cooling chamber into which said third conveyer may deliver said cartons; and means for operating all of said conveyers, substantially as described.

In testimony whereof, I affix my signature, in presence of two witnesses.

GEORGE W. BEADLE.

Witnesses:
H. T. RODGERS,
J. H. GEWECKE.